Sept. 25, 1934.   J. A. BATA   1,975,035
APPARATUS FOR THE MANUFACTURE OF FOOTWEAR
Filed Nov. 23, 1932   6 Sheets-Sheet 1
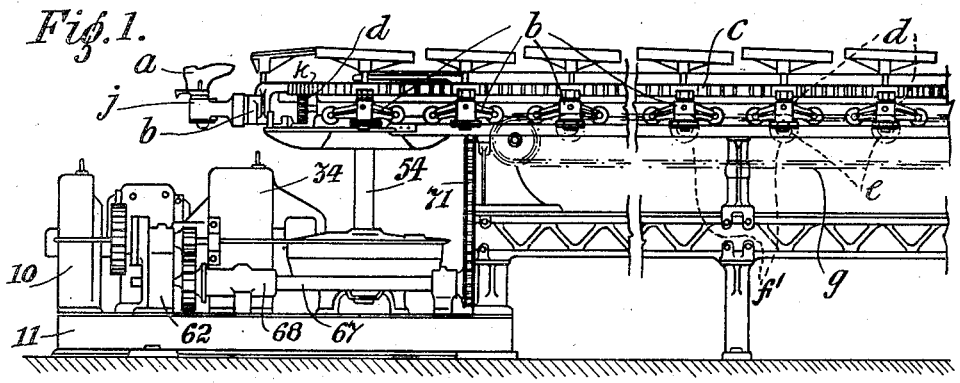
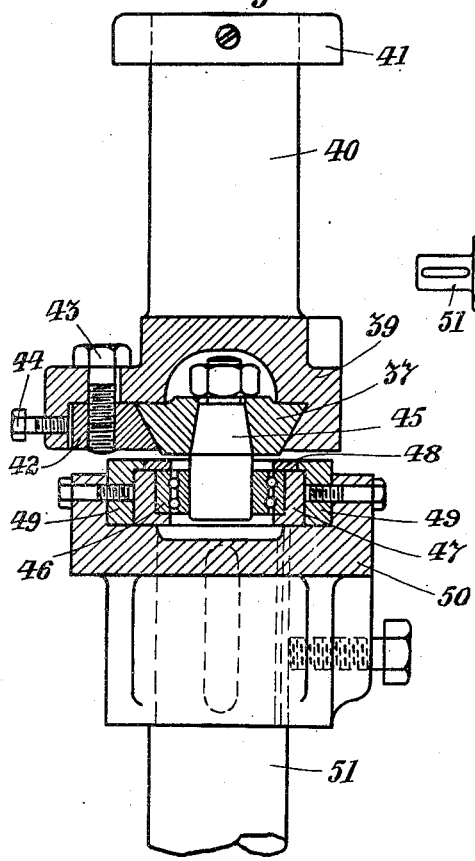
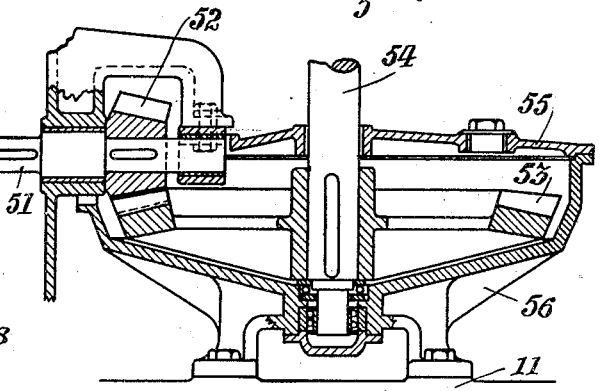

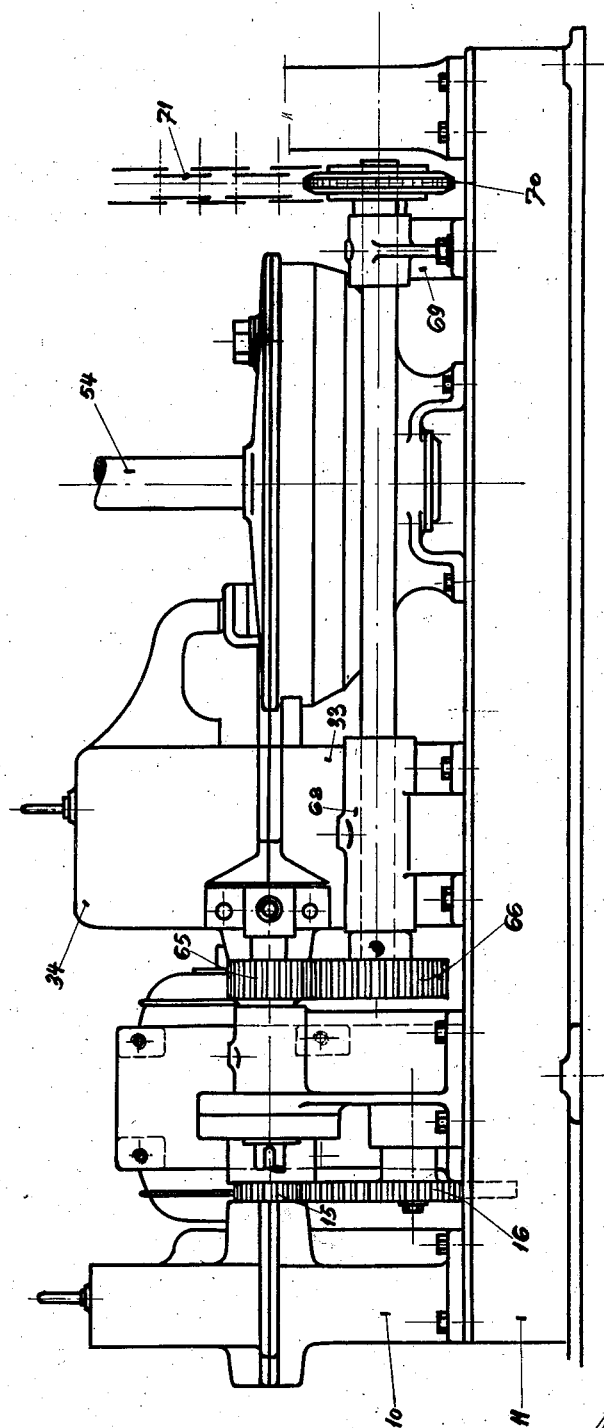

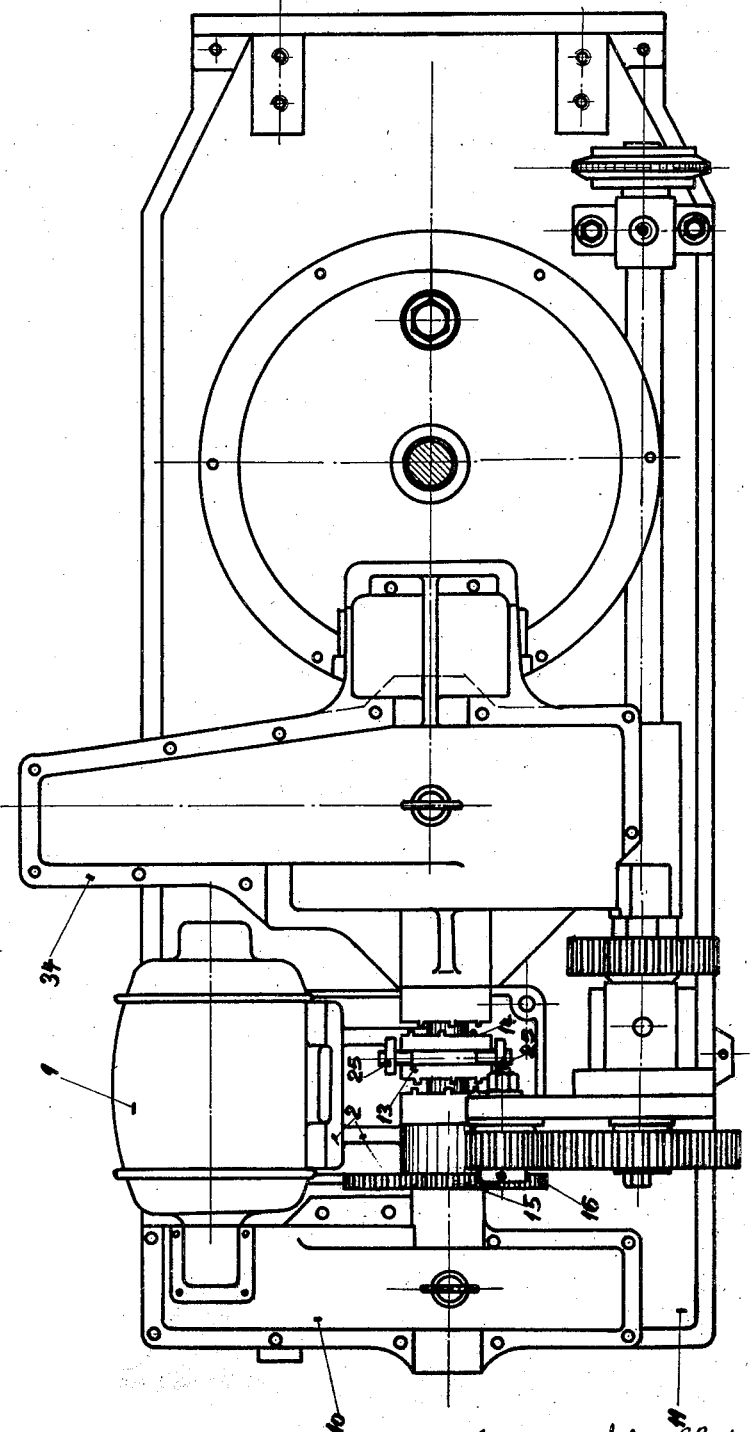

Patented Sept. 25, 1934

1,975,035

UNITED STATES PATENT OFFICE 1,975,035

APPARATUS FOR THE MANUFACTURE OF FOOTWEAR

Jan A. Bata, Zlin, Czechoslovakia

Application November 23, 1932, Serial No. 644,306
In Czechoslovakia December 4, 1931

10 Claims. (Cl. 12—1)

This invention relates to footwear manufacturing apparatus of the type set forth in my co-pending application Serial No. 644,305 in which lasts are adjustable into different positions on feed carriages which are adapted to be fed from one working position to another.

According to the present invention, such apparatus is driven by a central driving means so arranged that it can interchangeably provide for two drives, of which one operates the means for feeding the carriages along a track from one working position to the succeeding working positions, and the other operates the means for turning or adjusting the lasts, the first mentioned drive being then cut out.

In order to avoid shocks and energy losses in the movement of the carriages along the feed track, such movement is effected by means whereby the carriages are given a motion rising from zero to a definite maximum velocity, which at once drops again to zero as soon as the carriage arrives in its new working position.

Driving means embodying the invention will now be described, by way of example, with reference to the annexed drawings, in which:—

Fig. 1 is a front elevation of the driving means and the adjacent part of the feed track;

Fig. 2 is a front elevation of the driving means alone;

Fig. 3 is a plan view of the driving means;

Fig. 8 is a sectional view of a varying throw crank means employed in the apparatus;

Fig. 9 is a vertical section through bevel gear for the movement of the carriages along the feed track;

Figure 4:
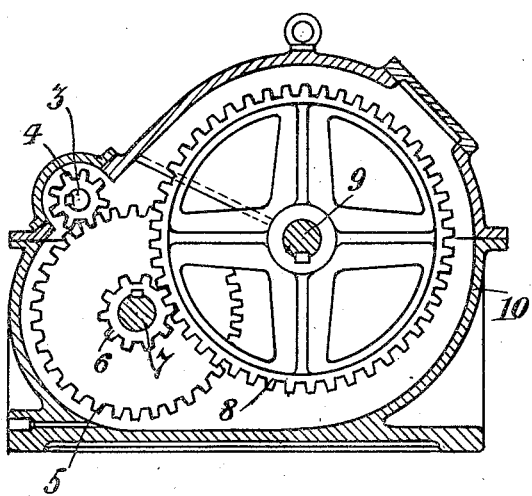
Fig. 4 is a vertical section through the gear box of the toothed wheels of the driving means.
Figure 5:
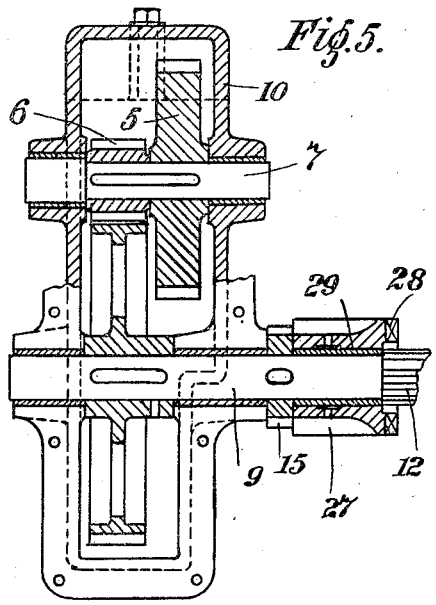
Fig. 5 is a horizontal section through the said gear box.

Referring to the drawings,

In the general view of the apparatus shown in Fig. 1, $a$ represents a last, which is mounted on a feed carriage $b$, there being a plurality of feed carriages $b$ each having a last, though only one of the latter is shown in Fig. 1. The feed carriages $b$ are fixed at equal intervals to a feed chain $c$ and each carriage has also a rotatable gear wheel $d$. At intervals along each side of the machine, toothed segments $e$ mounted on fixed axes are provided, and each segment $e$ is rotatable with a chain wheel $f$. These chain wheels are all in engagement with a last-turning chain $g$ so that by operation of such feed chain the wheels $f$ and segments $e$ can be turned thereby turning the particular gear wheels $d$ in engagement with the said segments. By the rotation of the gear wheel $d$ on the feed carriage either the head $j$ of the carriage is adapted to be rotated about its horizontal axis, or, by the operation of a clutch actuated by trip gear on the frame of the machine, as described in my co-pending application Serial No. 644,305, the last $a$ is adapted to be turned about its vertical axis on the head $j$.

The driving means, as shown in Figs. 1 to 5, consists of an electric motor 1 mounted on brackets 2, the shaft 3 of the motor 1 having a toothed wheel 4 which drives the large toothed wheel 8 of the shaft 9 through transmission wheels 5, 6 keyed on a common shaft 7.

The entire toothed-wheel transmission 4 to 8 is mounted in a two-part casing 10, which is screwed on a common foundation plate 11.

On a shaft 9 (Fig. 6) provided with longitudinal grooves 12, the middle portion of a dog clutch 13 is movably mounted, which portion has teeth 14 at both sides and grooves in its bore corresponding to the grooves 12 of the shaft 9. On the shaft 9 there is also provided a toothed wheel 15 which engages in a toothed wheel 16 which is mounted on one end of a shaft 17, on the other end of which there is keyed a clutching and declutching cam 18. The shaft 17 is mounted in a bearing 19 screwed on the common foundation plate 11.

The clutching and declutching cam 18 has a continuous groove 20 on its circumference, in which groove there engages a pin 21 secured in a clutching and declutching fork 22. The said fork is fixed on a shaft 23 which is slidable in bearings formed in brackets 24 (Fig. 3). The fork 22 (Fig. 6) is provided with engaging pins 25 which engage in the groove 26 of the middle portion of the clutch 13.

Figure 6:
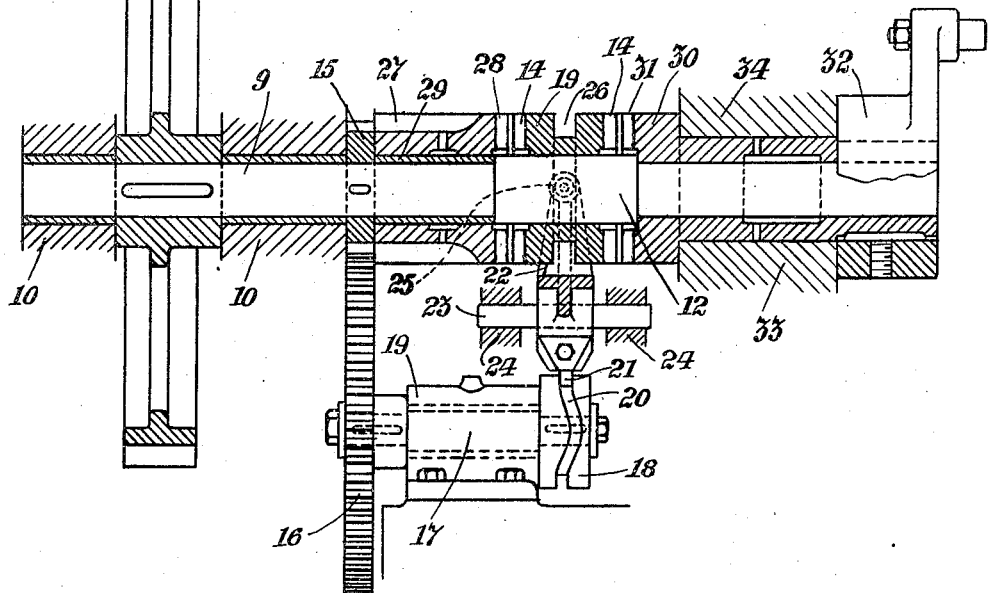
Fig. 6 is a sectional view in the plane of the main driving shaft showing clutching and declutching means.

The shaft 9 rotates continuously and the clutching and declutching cam 18 moves the fork 22 continuously backwards and forwards. This effects the engagement either of the left or right side of the middle portion of the dog clutch 13, 14. On movement of the clutch towards the left (Fig. 6), a gear member 27 is set in motion, this member being provided with side teeth 28 and being mounted on the shaft 9 by means of a bush 29. On movement of the clutch portion 13 towards the right (Fig. 6), a sleeve 30 is set in motion, this sleeve being provided on its enlarged left-hand end with teeth 31 and on its right-hand end with a crank 32 keyed thereon. The sleeve 30 is turnably mounted on the shaft 9 as well as in the two-part casing 33, 34 (Figs. 2, 3 and 6).

Figure 7:
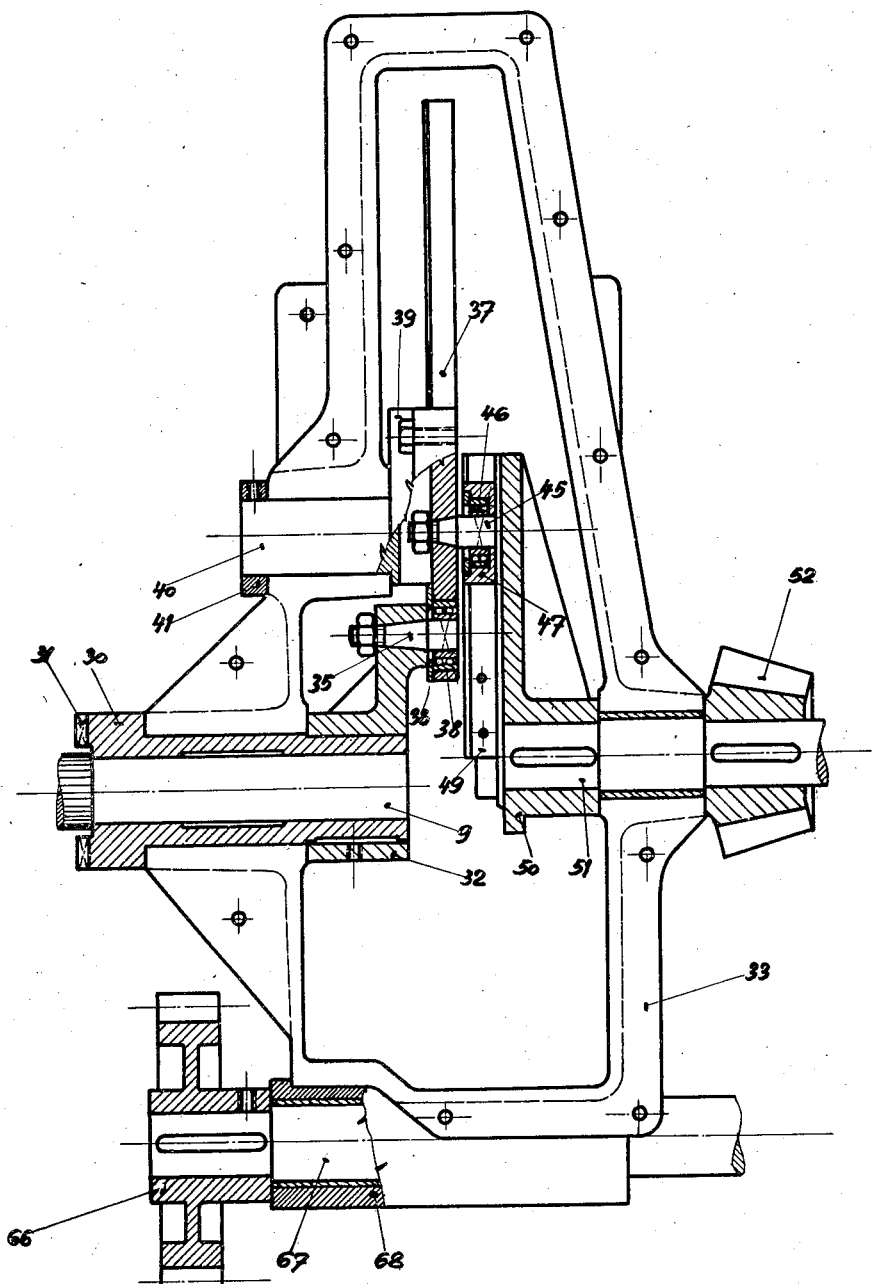
Fig. 7 is a horizontal sectional view through the crank case of the driving means, showing the means for accelerating and retarding the carriage movement.

In the crank 32 (Figs. 6 and 7), a pin 35 having a cone shaped part is fixed, the outer cylindrical part being engaged by a rod 37 of trapezoidal cross-section (Figs. 7 and 8) and being secured therein by a ring 38. The trapezoidal rod 37 (Fig. 8), during the movement of the crank 32 around the axis of the shaft 9, moves in a guide 39 of which the pin 40 is secured by a ring 41 rotatably in the casing 33, 34 so that the rod 37 can be swung and also slid upwards and downwards alternately. The guide 39 (Fig. 8) is provided with an interchangeable and adjustable insert 42 which is held in the guide 39 by a screw 43 and is adjustable by a screw 44.

In the trapezoidal rod 37, the pin 45 having a cone-shaped part is fixed, a ball bearing being provided on this pin to carry a sliding piece 47 which is secured in place by an outer ring 48. The sliding piece 47 is not cylindrical but has two flattened sides whereby greater sliding surfaces are formed by means of which the said sliding piece 47 can slide in guides 49 screwed on a crank 50.

This crank 50 (Figs. 7 and 8) is keyed to a shaft 51 having a bearing in one side of the casing 33, 34. On the outer end of the shaft 51 (Figs. 8 and 9) a small bevel wheel 52 is provided which engages with a large bevel wheel 53 keyed on a shaft 54 on which the chain wheel $k$ (see Fig. 1) for the movement of the carriages $b$ along the feed track is secured. The large bevel wheel 53 is supported with the shaft 54 in a housing 56 which is firmly screwed to the foundation plate 11 and is closed by a cover 55.

The above-mentioned acceleration and retardation of the rotation of the crank 50 is attained by virtue of the movement of the driving rod 37 (Fig. 7) in the guide 39, whereby the pin 45, during the movement of the crank 32, alters its distance from the axis of the shaft 51.

Figure 10:
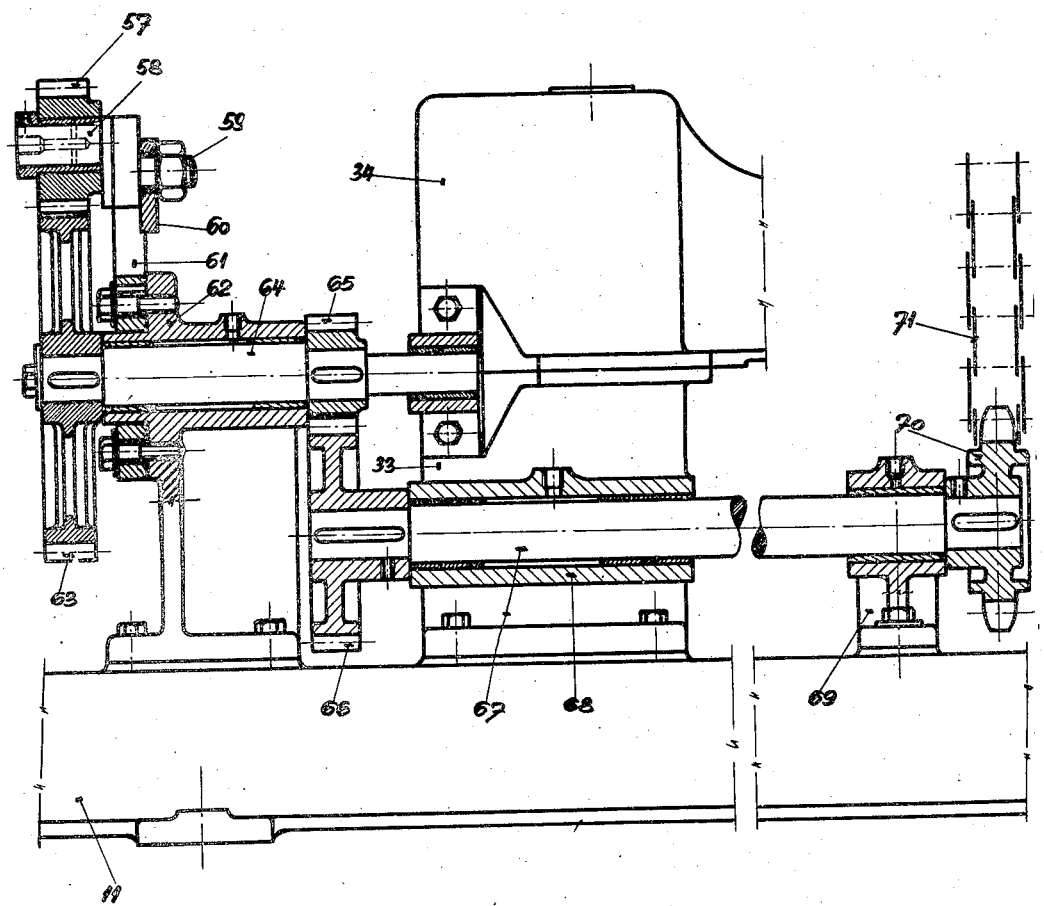
Fig. 10 is a vertical section through the transmission means which provides for the drive of segment mechanism and chains for operating the last adjusting means on the carriages.

When the middle portion of the coupling 13 (Fig. 6) is engaged with the gear member 27, it drives an intermediate toothed wheel 57 (Fig. 10) which is mounted on a pin 58 which, by means of a screw 59 and a washer 60, is attached to an arm 61 fixed by screws to a stand 62. The toothed wheel 57 engages with a toothed wheel 63 which is provided on a shaft 64 mounted in bearings in the stand 62 and casing 34. On the shaft 64 a small toothed wheel 65 is provided which engages in a larger toothed wheel 66 mounted on a shaft 67 which is carried by bearings 68, 69 and has at its other end a chain wheel 70. This wheel 70 drives a chain 71 which effects the drive of the chains for the segments of the last turning mechanism of the feed carriages.

The toothed wheel 57 (Fig. 10) is secured on the arm 61 so that, by interchange of the toothed wheel 57, the velocity of the shaft 67 and therefore the turning velocity of the carriage mechanism can be increased or decreased.

The general operation of the mechanism hereinbefore described is as follows:—

When the clutch portion 12 (Fig. 6) is moved towards the right and thereby causes the crank 32 to rotate the crank 50 with the accelerating and retarding movement already described, the chain wheel $k$ causes the feed chain $c$ to move all the feed carriages $b$ along the feed track with a velocity which accelerates from zero until the feed carriages at the sides of the machine reach a position midway between the corresponding adjoining segments $e$ and then drops to zero when the feed carriages are opposite such segments. When the feed carriages have thus been transferred forward a distance equal to the interval between adjacent segments $e$, the clutch member 13 is moved to the left (Fig. 6) so that it drives the gear member 27 and effects rotation of the chain wheel 70 as already described, whereby the last-turning chain $g$ (Fig. 1) at each side of the machine is operated. On movement of each last-turning chain $g$, the carriages $b$ having their gear wheels $d$ in engagement with segments $e$ have their lasts $a$ adjusted through the rotation of the chain wheels $f$ by the corresponding last-turning chain $g$. When each gear wheel $d$ has thus been rotated to effect the desired adjustment of the last $a$ about a vertical or horizontal axis as previously referred to, the clutch member 13 (Fig. 6) is disengaged from the gear member 27 and the operatives proceed to perform their particular operation on the shoes delivered opposite to them. The speed of the clutch member 13 is determined by the electric motor which is adjusted so that sufficient time is permitted for the operatives to complete their respective operations on the shoes before the clutch member is again moved to the right (Fig. 6) so as to cause the chain $c$ to move the feed carriages $b$ one stage forward once more.

This stage by stage movement of the feed carriages with the particular adjustment of the lasts at the different working positions along each side of the machine, is repeated continuously, and the manufacture of each shoe is advanced one step as it passes successively to each different working position.

I claim:—

1. For footwear manufacturing apparatus having lasts mounted on carriages, feed means whereby said carriages are fed simultaneously from one working position to another, and adjusting means whereby said lasts are adjustable into different positions on said carriages, the combination of driving means, and interchanging gear whereby said driving means is adapted to drive either said carriage feed means or said last adjusting means.

2. For footwear manufacturing apparatus having lasts mounted on carriages, feed means whereby said carriages are fed simultaneously into different working positions, and segment means whereby each last is adjustable into different positions on its carriage, the combination of continuously acting driving means, and interchanging gear whereby said driving means is adapted to drive either said carriage feed means or said segment means.

3. The combination claimed in claim 1 comprising means whereby said interchanging gear is actuated automatically so as to drive in turn said carriage feed means and said last adjusting means.

4. The combination claimed in claim 1 comprising dog clutch means for interchangeably driving said carriage feed means or said last adjusting means by said driving means.

5. For footwear manufacturing apparatus having lasts each mounted on a carriage, feed means whereby said carriages are fed simultaneously from one working position to another, and adjusting means whereby each of said lasts is turnable into different positions on its carriage, the combination of continuously rotating driving means, dog clutch means adapted operatively to connect said driving means with either said carriage feed means or the last-turning means, and cam means whereby said dog clutch means is reciprocated so as automatically to connect said feed means and turning means to said driving means alternately.

6. For footwear manufacturing apparatus having lasts mounted on carriages, feed means whereby said carriages are fed simultaneously from one working position to another, and adjusting means whereby said lasts are adjustable into different positions on said carriages, the combination of driving means, transmission mechanism imparting to said feed means from said driving means a non-uniform motion whereby the velocity of each carriage rises from zero at one working position to a predetermined maximum and then drops to zero at a succeeding working position, and interchanging gear whereby said driving means is adapted to drive either said transmission means or said last adjusting means.

7. The combination claimed in claim 6 comprising crank means and means for periodically varying the throw of said crank means automatically so as to obtain said non-uniform motion of said carriages.

8. The combination claimed in claim 6 comprising crank means, and combined swinging and reciprocating means for varying the throw of said crank means during each rotation thereof so as to effect said non-uniform motion of said carriages.

9. For footwear manufacturing apparatus having lasts each mounted adjustably on a carriage, feed means whereby said carriage is fed from one working position to another, and means for adjusting said last into different positions on said carriage, the combination of continuously rotating driving means, dog clutch means rotatable by said driving means, a gear member, transmission means connecting said gear member to said last-adjusting means, and means whereby said dog clutch means is operable so as to drive either said gear member or said carriage feed means from said driving means.

10. The combination claimed in claim 5 comprising a continuously rotating grooved cam, reciprocable means engaging said grooved cam, and means connecting said reciprocable means to said dog clutch means so as alternately to connect said driving means to said last-turning means and carriage feed means.

JAN A. BATA.